March 6, 1973 C. S. RAWLINGS 3,719,372

AUTOMATIC TRACTOR-TRAILER COUPLING DEVICE

Filed Dec. 30, 1971 2 Sheets-Sheet 1

INVENTOR.
CHARLES S. RAWLINGS

3,719,372
AUTOMATIC TRACTOR-TRAILER COUPLING DEVICE

Charles S. Rawlings, Augusta, Kans., assignor of a fractional part interest to The Raymond Lee Organization, Inc., New York, N.Y.
Filed Dec. 30, 1971, Ser. No. 214,077
Int. Cl. B60d 1/08
U.S. Cl. 280—421         5 Claims

ABSTRACT OF THE DISCLOSURE

The automatic coupling and uncoupling of tractors to trailers and semi-trailers is accomplished by this device which modifies the conventional tractor fifth wheel to include automatic coupling of the electric light and the air line cables supplying the trailer from the tractor. Mating coupling members are incorporated on the trailer for automatic coupling action, or manual coupling may be accomplished with trailers which are not so equipped.

SUMMARY OF THE INVENTION

The purpose of my invention is to simplify the task of coupling and uncoupling the conventional tractor-trailer and tractor semi-trailer units now employed.

At present, considerable time and effort is required of the truck driver when he delivers or picks up a semi-trailer. The driver is required at present to dismount from his cab and to manually make or break the several air and electric connections between the two units.

In my invention, the driver is able to control the entire operation from the cab of his vehicle, and particularly if the semi-trailer unit is also equipped with the invention described in my copending application Ser. No. 210,392 filed on Dec. 21, 1971, and entitled, "Landing Gear Elevating Device."

In my invention, the fifth wheel of the tractor is modified to include an electrical conducting ring which is insulated from the fifth wheel itself, and to include several grooves in the surface of the fifth wheel for supply of various compressed air circuits. The semi-trailer is modified to contain the mating devices to couple to these electric and air supply rings of the tractor fifth wheel.

BRIEF DESCRIPTION OF THE DRAWINGS

The objects and features of the invention may be understood with reference to the following detailed description of an illustrative embodiment of the invention taken together with the accompanying drawing in which.

DESCRIPTION OF THE PREFERRED EMBODIMENT

Figure 1:
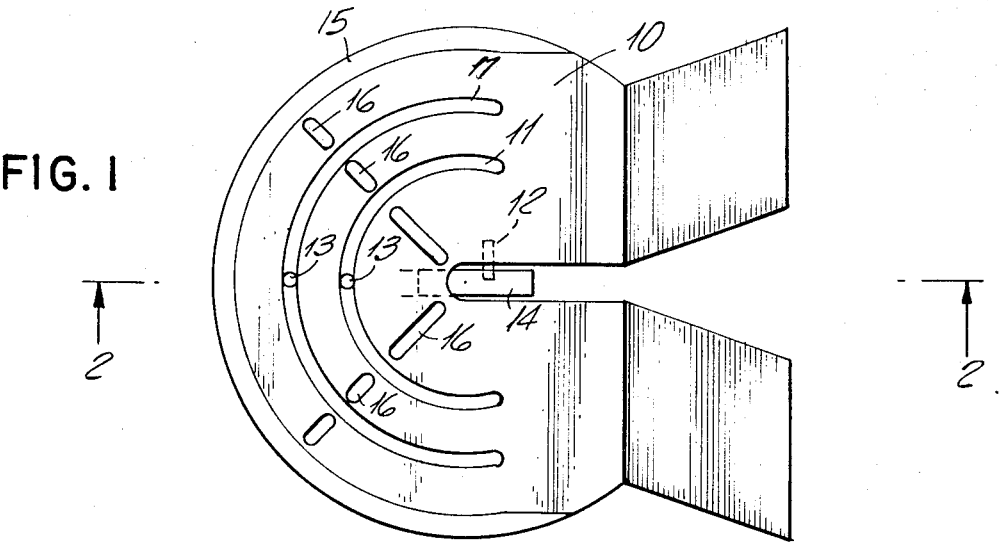
FIG. 1 is a plan view of the modified tractor fifth wheel.
Figure 2:
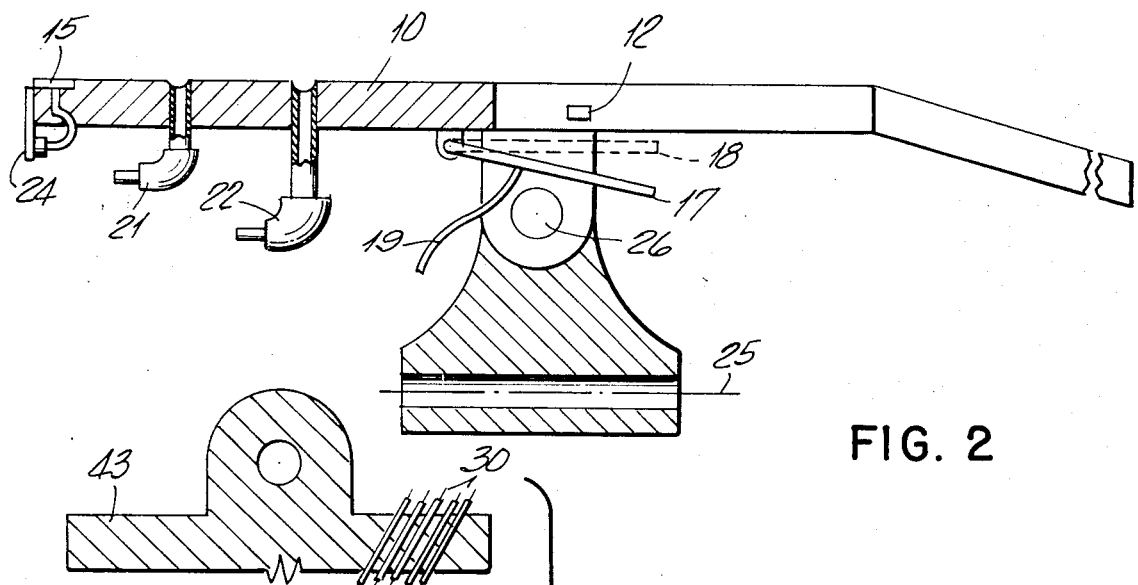
FIG. 2 is a partial cross-section of the fifth wheel along line 2—2 of FIG. 1.
Figure 4:
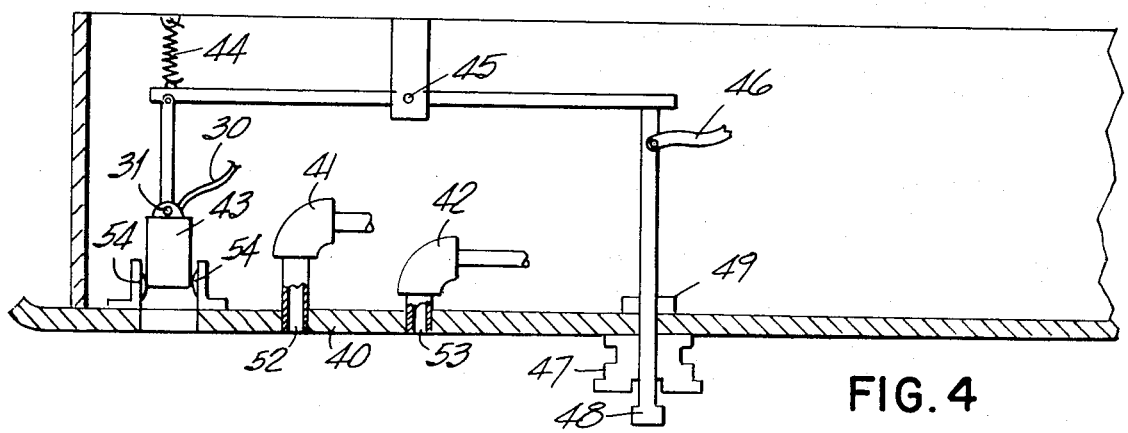
FIG. 4 is a cross-section of the coupling mechanism installed on the trailer.

Turning now descriptively to the drawings, in which similar reference characters denote similar elements throughout the several views, FIG. 1 and FIG. 2 depict the tractor fifth wheel 10 which locks to the king pin 47 of the semi-trailer with lock pin 12. Radial grooves 16 in the fifth wheel provide for the necessary lubrication, and circular grooves 11 match with fittings 52 and 53 in the trailer plate 40 as shown in FIG. 4, to provide the air connections. The outer air circular groove 11 is connected to the tractor service airline 21, and the inner circular air groove 11 is connected to the tractor emergency airline 22.

Figure 3:
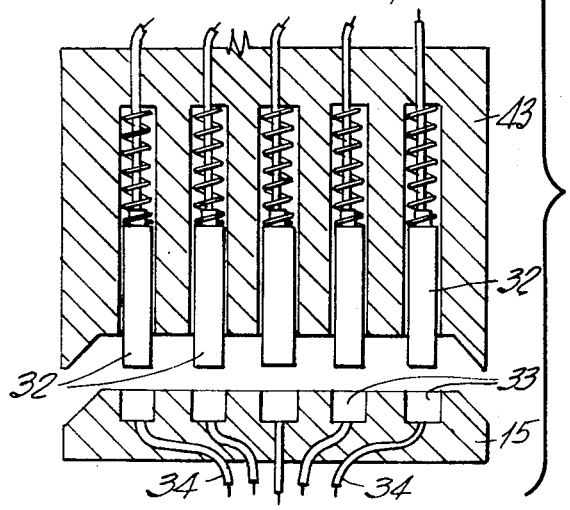
FIG. 3 is a cross-section of the mating electrical contact mechanism of tractor and trailer.

Circular ring 15 along the circumference of the fifth wheel 10 contains five concentric bare electric conductors 33 insulated from each other and from the frame. Conductors 33 in the coupled mode, mate with carbon brushes 32 in plug 43 which are connected by wire cable 30 to the trailer wiring system, as shown in FIG. 3 and FIG. 4.

A common wire 19 to the tractor electrical system is connected to the plunger ramp 17, which is shown in the raised position at 18.

An electrical light receptacle 24 at the front of the fifth wheel is electrically connected to the cable 34 powering the conductors 33 of the circular ring 15.

The roll axis 25 and pitch axis 26 of the fifth wheel are in the conventional locations.

Figure 5:
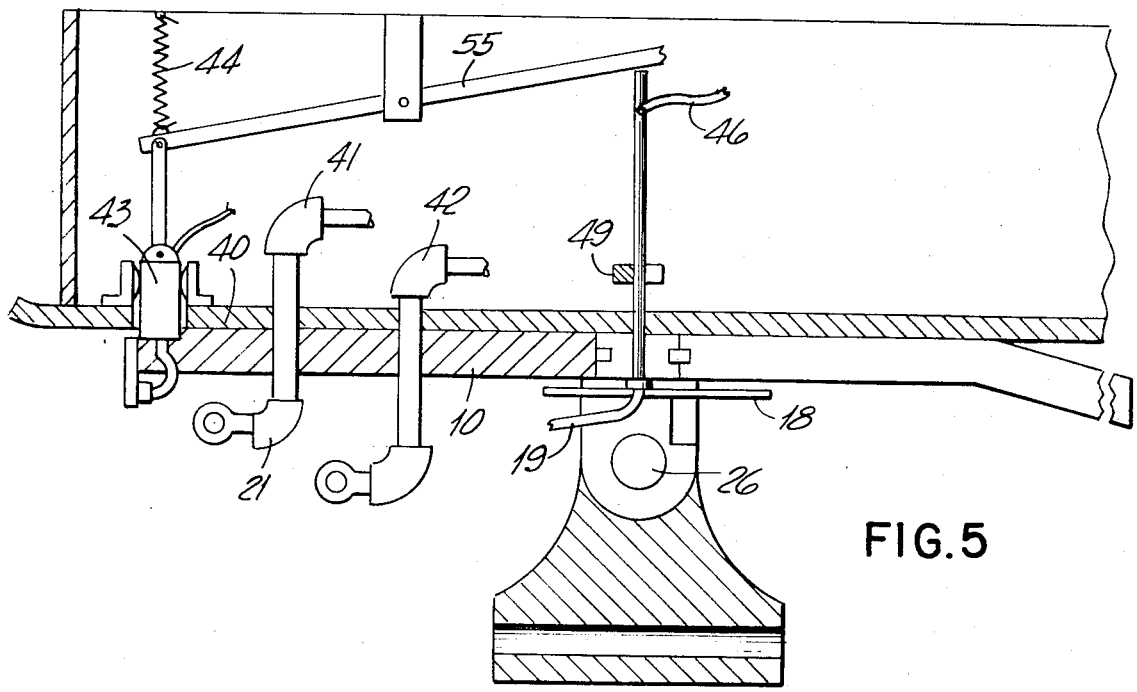
FIG. 5 is a partial cross-section of the coupled tractor trailer unit.
Figure 6:
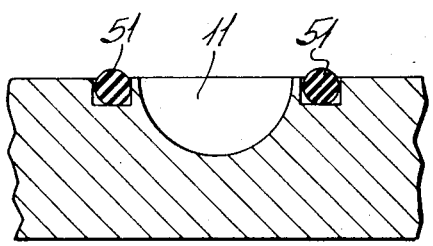
FIG. 6 is a cross-section of the tractor fifth wheel in the section of the air groove.

As shown in FIG. 4 and FIG. 5 the trailer plate 40 which rests against the fifth wheel contains mating trailer air line receptacles 41 and 42 to connect with the grooves 11 of the fifth wheel, regardless of the angular relation between the truck and the trailer. The airline grooves 11 in the fifth wheel are sealed by concentric adjacent protruding seals 51 and by the plate 40 of the trailer as shown in FIG. 6.

When the semi-trailer is coupled to the tractor, plunger 48, which rides through the center of the trailer king pin, is pushed upwards by plunger ramp 18 to rotate lever 55 about the semi-trailer fulcrum point 45. This action lowers the electrical contact plug 43 past spring slides 54 against the mating electrical contact ring 15 in the fifth wheel of the tractor. Plunger stop 49 limits the extent of the fall of plunger 48 caused by tension spring 44 when the semi-trailer is disconnected from the tractor.

Since obvious changes may be made in the specific embodiment of the invention described herein without departing from the scope thereof, it is indicated that all matter contained herein is intended to be interpreted in an illustrative and not a limiting sense.

Having thus described my invention, what I claim as new and desire to secure by Letters Patent of the United States is:

1. A coupling mechanism for joining the air and electrical lines of a tractor to the air and electric lines of the towed trailer or semi-trailer, the connection of said air and electric lines being automatically achieved when the tractor is coupled to the trailer or semi-trailer through the conventional fifth wheel-king pin coupling, and the connection of said lines being automatically broken when said tractor is uncoupled from said trailer or semi-trailer, said mechanism consisting of a series of concentric grooves in the surface of the fifth wheel of the tractor with each groove being joined to a particular air supply line of the tractor, and a series of concentric bare electrical conductors in the surface of the fifth wheel insulated from each other and from the frame of the fifth wheel.

2. A coupling mechanism as described in claim 1 in which each of said grooves joined to the air supply line of the tractor is bounded on each side by a protruding seal of flexible material.

3. A coupling mechanism as described in claim 2 in combination with mating holllow fittings in the plate member of the coupled trailer or semi-trailer, each of said hollow fittings being connected to an air line of the semi-trailer, and each of said fittings being spaced a distance from the center of the king pin corresponding to the radius of one of the mating grooves in the fifth wheel of the tractor.

4. A coupling mechanism as described in claim 1 in combination with an electrical connector mounted in the plate member of the coupled trailer or semi-trailer, said electrical connector containing electrical contact members each insulated from each other, and each connected to an electrical circuit of the trailer or semi-trailer, said electrical connector being located, with respect to the king pin of said trailer or semi-trailer, the equivalent radius of the band of concentric electrical conductors in the fifth wheel of the tractor, so that each of the electrical contact members in the electrical connector of the semi-trailer or trailer is in electrical contact with one of the bare electrical conductors on the fifth wheel of the tractor.

5. A coupling mechanism as described in claim 4 in which the electrical connector mounted in the plate member of the coupled trailer or semi-trailer may be moved vertically so as to make or break the electrical connections between the tractor and the coupled vehicle, such movement of the electrical connector being responsive to the movement of a plunger mounted in a hole in the center of the king pin of the towed vehicle.

References Cited

UNITED STATES PATENTS

| | | | |
|---|---|---|---|
| 1,926,264 | 9/1933 | Connors | 280—422 |
| 1,931,752 | 10/1933 | Connors | 280—422 |
| 2,457,478 | 12/1948 | Letvin | 280—421 |
| 3,428,334 | 2/1969 | Hils | 280—421 |
| 3,628,811 | 12/1971 | Rivers | 280—422 |

LEO FRIAGLIA, Primary Examiner

U.S. Cl. X.R.

280—422